United States Patent [19]
Ibanez-Meier et al.

[11] Patent Number: 5,949,766
[45] Date of Patent: Sep. 7, 1999

[54] GROUND DEVICE FOR COMMUNICATING WITH AN ELEVATED COMMUNICATION HUB AND METHOD OF OPERATION THEREOF

[75] Inventors: Rodrigo Ibanez-Meier, Chandler; Vijay Kapoor; Sergio Aguirre, both of Phoenix, all of Ariz.

[73] Assignee: Motorola, Inc., Schaumburg, Ill.

[21] Appl. No.: 08/777,563

[22] Filed: Dec. 30, 1996

[51] Int. Cl.$^6$ ...................................................... H04B 7/19
[52] U.S. Cl. ........................ 370/316; 455/13.1; 455/427; 395/200
[58] Field of Search ..................................... 370/316, 319, 370/320, 321; 455/11.1, 12.1, 13.1, 13.3, 427, 431, 430; 395/200

[56] References Cited

U.S. PATENT DOCUMENTS

| | | | |
|---|---|---|---|
| 3,742,358 | 6/1973 | Cesaro | 325/3 |
| 5,280,625 | 1/1994 | Howarter et al. | 395/200 |
| 5,327,572 | 7/1994 | Freeburg | 455/427 |
| 5,552,920 | 9/1996 | Glynn | 359/172 |
| 5,584,046 | 12/1996 | Martinez et al. | 455/13.1 |

OTHER PUBLICATIONS

Millar, "Messages by Balloon", *Popular Science*, Oct. 1996, p. 40.

Sugar, "A New Way to Fly, and Fly, and . . . ", *National Geographic*, Sep. 1996.

Haig, "Application of Sky Station International, Inc.", Before the Federal Communications Commission, Mar. 20, 1996.

*Primary Examiner*—Chi H. Pham
*Assistant Examiner*—Maikhanh Tran
*Attorney, Agent, or Firm*—Sherry J. Whitney; Dana B. LeMoine; Frank J. Bogacz

[57] ABSTRACT

A method and apparatus for communicating with a high-altitude communication platform (110) which combines multiple signals from multiple sources into one signal which is sent to a ground device (120). The ground device (120) can send a combined signal to the platform (110) which the platform (110) can then separate and send to multiple destinations. The ground device (120) also can provide spectral reuse by orienting directional antennas (360–362) toward the communication platform (110) and one or more spatially diverse other wireless devices.

9 Claims, 10 Drawing Sheets

100

GROUND DEVICE FOR COMMUNICATING WITH AN ELEVATED COMMUNICATION HUB AND METHOD OF OPERATION THEREOF

CROSS-REFERENCE TO RELATED INVENTION

The present invention is related to U.S. patent application Ser. No. 08/774,764, entitled "Elevated Communication Hub and Method of Operation Therefor," filed Dec. 30, 1996, and assigned to the same assignee as the present invention.

FIELD OF THE INVENTION

The present invention relates generally to wireless communications and, more particularly, to devices for enabling communication of signals between wireless communication devices.

BACKGROUND OF THE INVENTION

Global satellite communication systems have been designed which provide worldwide service to communication devices located on or near the ground. Many of these systems use "cross-links" between satellites to route data from one part of the world to another. In order for two satellites to communicate directly, the satellites must be in line-of-sight ("LOS") of each other.

To provide a fully-connected network of non-geosynchronous satellites, the communication system would need to deploy a relatively large number of satellites so that enough satellites encircle the earth to provide LOS between satellites. A large number of satellites increases the start-up and operational costs of the system. For example, one major start-up cost is the launch cost which is driven by satellite weight and number of satellites deployed. Systems are deployed a few satellites at a time. Therefore, a fully-connected satellite network is not possible during early stages of deployment because not enough satellites are in orbit to provide interconnectivity. This leads to another major system cost, which is the opportunity cost of lost market share and inability to generate substantial operations revenue early in the deployment phase of a satellite system.

In many instances, satellite services might not be available for communication due to prohibitive cost, insufficient transmission power, or other limitations. Such systems must rely on terrestrial RF links or hardwired links in order to communicate. Where RF or hardwired links do not exist, rapid communication also does not exist.

What are need are an apparatus and method that enables communication services using a constellation having a smaller number of satellites or even no satellites. Further needed are an apparatus and method where communication devices and/or satellites with no LOS or hardwired connections can communicate with each other without any significant delays.

A ground device which communicates with a satellite must be specially adapted because of the proximity of the satellite to the ground device. For example, many ground devices have directional antennas which must be oriented toward a particular satellite. Where the satellite is non-geostationary, the antenna must track the satellite during the time that the ground device wants to receive signals. Some ground devices receive signals from multiple satellites and/or other sources. These multi-receiver ground devices must have dedicated directional antennas and, where necessary, tracking devices for each satellite or other signal source. For example, a ground device might be adapted to receive signals from two geosynchronous satellites, each satellite providing a different communication service. If the user of such a ground device wants to receive signals from a third source, the user must physically modify the ground device hardware or purchase a separate device which enables reception of signals from the third source. Thus, existing multi-receiver ground devices are inflexible and prone to being insufficient or becoming obsolete.

Another feature of satellite-to-ground communications is that the satellite and ground device must transmit signals at relatively high power in order for the signals to be received across the great distance between the satellite and ground device. Obstructions and low elevation angles between the ground device and the satellite and/or other signal source also mandate high-power transmissions and/or lack of high-quality signal reception. Besides high-power transmitters, the satellite and ground device also must have sensitive receivers in order to receive the signals from each other. Ground devices, thus, have many equipment requirements in order to communicate with one or more satellites or other signal sources. Because of these equipment requirements, such ground devices are typically very expensive when compared with the cost of equipment which communicates exclusively with terrestrial signal sources.

What are needed are a relatively-inexpensive ground device for communication with one or more satellites and/or other signal sources and a method of operating such a device. Also needed are a flexible ground device and method of operation where the ground device can receive information from additional signal sources without modifying the physical hardware of the ground device. Also needed are an apparatus and method to enable operation of such inexpensive and flexible ground devices. Further needed are a method and apparatus which enable a ground device to better communicate with a satellite and/or signal source which transmits at an insufficient power level, is located at low elevation angle, or is located behind an obstruction relative to the ground device.

Currently, terrestrial cellular base stations and proposed communication satellites provide cellular communications to ground devices. The cellular beams from those base stations and satellites typically have precise geometries on the surface of the earth which enable non-adjacent beams to reuse allocated spectrum. Especially with respect to existing terrestrial base stations, each cellular beam requires dedicated hardware and cell geometries can only be modified by physically changing the characteristics of the hardware. Thus, altering cell geometries to respond in real-time to traffic loading is not a practical solution in such systems.

What are needed are a method and apparatus that enables high definition and flexible cell geometries without the need for hardware modifications.

Communication satellites also are used in sensing applications. For example, satellites are used to monitor weather or other physical phenomenon which occur proximate to the surface of the earth. The ability of such sensing satellites to observe phenomenon to a high level of accuracy is limited by the distance of the satellites from the phenomenon and/or obstructions which exist between the satellite and the phenomenon. More expensive and heavier sensing equipment can be used to enhance accuracy, but only to the limit of current technology.

What are further needed are a method and apparatus for sensing physical phenomenon which provide more accurate data than is possible with sensing satellites.

DETAILED DESCRIPTION OF THE DRAWINGS

The method and apparatus of the present invention provides inexpensive and relatively simple devices and methods for communicating between multiple wireless communication devices. This includes interfacing ground devices and satellites by shifting antennas and otherwise expensive equipment to a non-orbiting communication platform (referred to herein as a "platform") which interfaces the satellites with the ground devices. Although interfacing satellites with ground devices is one useful application, the method and apparatus of the present invention basically provides interfaces between any two wireless communication devices using a non-orbiting communication platform.

As used herein, a "wireless communication device" refers to any device which communicates without hard-wired connections, including but not limited to cellular telephones, pagers, data devices, satellites, radios and any other optical, radio frequency (RF), or non-hardwired communication device. A "ground device" is used herein to mean any wireless communication device which is located proximate to, above, or below the surface of the earth. A "satellite" is used herein to mean an orbiting wireless communication device which can be located in any orbit including, but not limited to, low-earth orbit (LEO), medium-earth orbit (MEO), high-earth orbit (HEO), or geosynchronous orbit (GEO). A "signal source" or "signal destination" is used herein to mean any wireless communication device.

Figure 1:
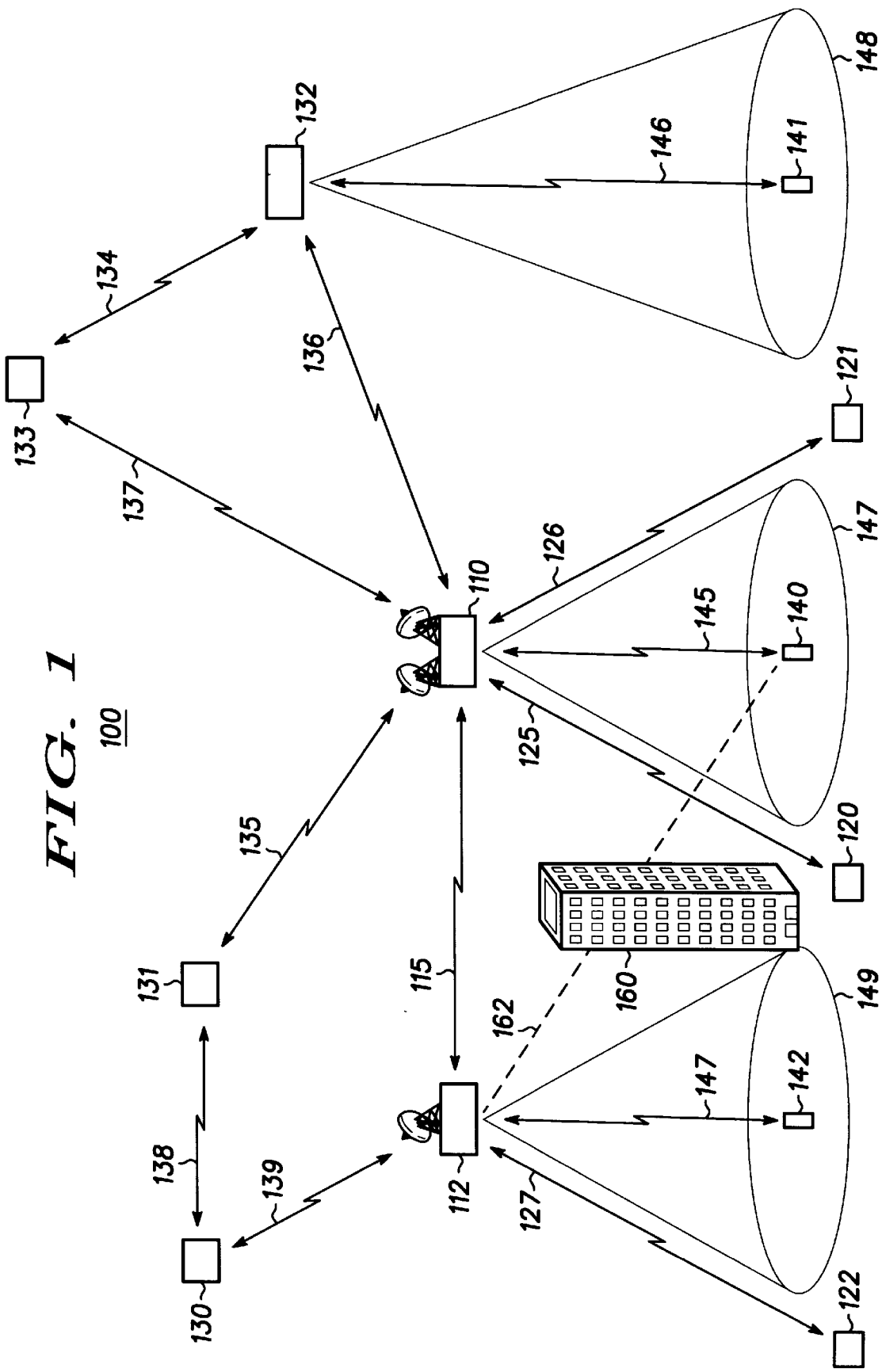
FIG. 1 illustrates a communication system in accordance with a preferred embodiment of the present invention.

FIG. 1 illustrates communication system 100 in accordance with a preferred embodiment of the present invention. Communication system 100, in varying embodiments, includes some combination of communication platforms 110, 112, signal source/destination devices 120–122, satellites 130–133, and communication devices 140–142. In a preferred embodiment, communication system 100 includes all of the above devices.

Communication platforms 110, 112 are central to communication system 100 and provide many of the advantages of the method and apparatus of the present invention. Basically, communication platforms 110, 112 provide interfaces between various other wireless communication devices 120–122, 130–133, and 140–142. Several of the interface capabilities of communication platforms 110, 112 will now be described.

Platform 110 is shown to provide an interface between satellites 131–133, signal source/destination devices 120, 121, and communication device 140. Platform 110 communicates with satellites 131, 132 over links 135, 136, respectively. In a preferred embodiment, links 135, 136 are bi-directional links, although unidirectional links in either direction could be used in alternate embodiments. Satellites 130–131 are shown to be LEO satellites which travel in orbits around the earth. Platform 110 also communicates with satellite 133 over link 137, where satellite 133 is shown to be a GEO satellite. Although platform 110 is shown to communicate with three satellites having varying orbits, platform 110 could communicate with more or fewer satellites having different varieties of orbits.

Platform 110 is also shown to communicate with signal source/destination devices 120, 121 over links 125, 126, respectively. In a preferred embodiment, links 125, 126 are bi-directional links, although uni-directional links in either direction could be used in alternate embodiments. Signal source/destination devices 120–122 could be, for example, cellular telephones, pagers, data devices, base stations, base station controllers, network interfaces, communication gateways, control facilities, other customer premise equipment (CPE), or wireless communication devices.

Platforms 110, 112 communicate with communication devices 140, 142 over links 145, 147, respectively. Platforms 110, 112 could provide either or both broadband or narrow-band services to communication devices 140, 142. Where platforms 110, 112 provide narrow-band services to devices 140, 142, links 145, 146 are provided within cellular beams or beam patterns 147, 149. In a preferred embodiment, links 145, 147 are bi-directional links, although unidirectional links in either direction could be used in alternate embodiments. Communication devices 140, 142 could be fixed or movable terminals for broadband or narrow-band services (e.g., cellular communication devices such as cellular telephones or pagers).

Platform 110 also communicates with a second platform 112 over cross-link 115. In a preferred embodiment, cross-link 115 is a bi-directional link, although a uni-directional link in either direction could be used in alternate embodiments. By communicating with platform 112 over cross-link 115, information can be exchanged between wireless communication devices serviced by platform 110 and wireless communication devices serviced by platform 112 (e.g., signal source/destination device 122, communication device 142, and/or satellite 130). Platform 112 communicates with signal source/destination device 122, communication device 142, and/or satellite 130 over links 127, 147, and 139 which are similar to links 125, 145, and 135, respectively.

Other links are shown within communication system 100 to illustrate various ways to route information between wireless communication devices. For example, an alternate route between platform 110 and platform 112 could include one or more satellites 130, 131 with associated satellite-to-platform links 135, 139 and inter-satellite crosslink 136. Another example shows a satellite-to-platform link 136 which enables satellite 132 to communicate data between platform 110 and communication device 141. Satellite 132 provides link 146 within cellular beam pattern 148 to communication device 141. Link 134 is also shown between GEO satellite 133 and satellite 132 which provides an alternate path along links 137 and 134 between platform 110 and satellite 132. The particular routes which platforms 110, 112 use to transfer data from one wireless communication device to another can be varied in numerous ways which are intended to be within the scope of the present invention.

Links 115, 125–127, 145–147, and 134–139 could be any type of wireless link including, but not limited to, RF or optical links. Depending on the type of link, particular obstructions could significantly degrade or preclude the formation of a link between a communication device and a platform. For example, FIG. 1 shows obstruction 160 along a line-of-sight between communication device 140 and platform 112. If hypothetical link 162 were an optical link or a millimeter wave link, then link 162 would not be able to be formed.

The types of interfaces provided by platforms 110, 112 and the methods of providing those interfaces are explained in detail below in conjunction with FIGS. 2–17. FIG. 1 is meant to illustrate a set of devices which could be interfaced using a communication platform in accordance with a preferred embodiment of the present invention. FIG. 1 is not meant to be limiting. For example, although two platforms 110, 112, four satellites 130–133, three signal source/destination devices 120–122, and three communication devices 140–142 are shown in FIG. 1 for the purposes of illustration, more or fewer of any of these devices could be used.

Figure 2:
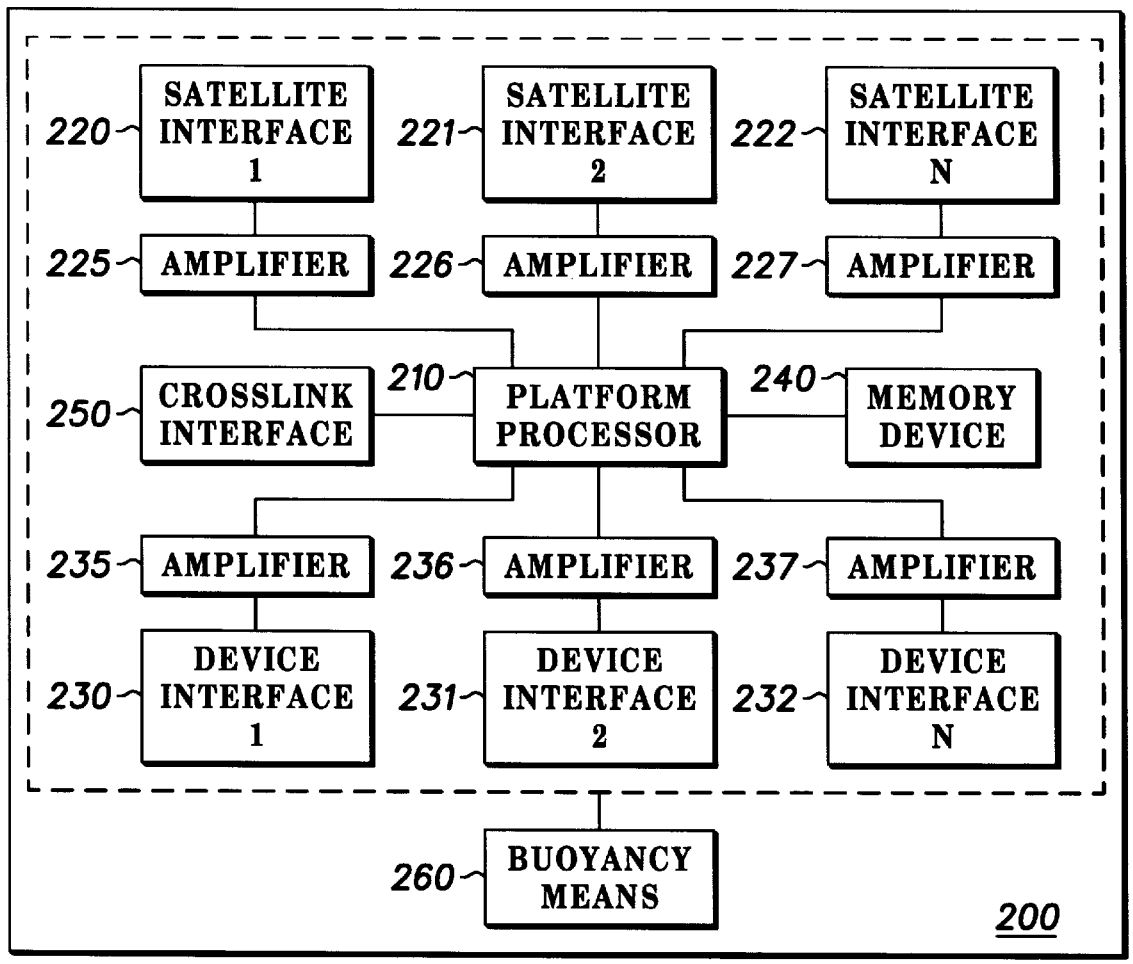
FIG. 2 illustrates a block diagram of a communication platform in accordance with a preferred embodiment of the present invention.

FIG. 2 illustrates a block diagram of communication platform 200 in accordance with a preferred embodiment of the present invention. In a preferred embodiment, platform 200 includes platform processor 210, satellite interfaces 220–222, satellite link amplifiers 225–227, device interfaces 230–232, device link amplifiers 235–237, memory device 240, cross-link interface 250, and buoyancy means 260.

In alternate embodiments, not all of these components of platform 200 need to be present. The components present depend on the function platform 200 is expected to perform. The various functions performed by platform 200 will be described in detail in FIGS. 4, 5, 8, 9, and 12. The descriptions associated with these figures will refer to specific components in FIG. 2 which are necessary to perform the described functions. For each function described, only those components associated with the description for the function are necessary for the embodiment which performs the function.

Although FIG. 2 illustrates three satellite interfaces 220–222, three satellite link amplifiers 225–227, three device interfaces 230–232, three device link amplifiers 235–237, and one cross-link interface 250, more or fewer of these components could be used in various embodiments. For example, in some embodiments, platform 200 could include no amplifiers 225–227, 235–237.

Satellite interfaces 220–222 provide communications capabilities with satellites (e.g., satellites 130–133, FIG. 1). Satellite interfaces 220–222 could include, for example, directional antennas and means for tracking satellites, where necessary. Alternatively, satellite interfaces 220–222 could include phased array, omni-directional, optical, or any other type of antenna or combination thereof. In a preferred embodiment, satellite interfaces 220–222 can be oriented toward multiple satellites which are spatially separated from each other by angles which enable spectral reuse. Satellite link amplifiers 225–227 are used to amplify signals which are to be transmitted to satellites and/or to amplify signals received from satellites when necessary. In an alternate embodiment, amplification could be performed digitally by processor 210.

Similarly, device interfaces 230–232 provide communications capabilities with ground devices (e.g., signal source/destination devices 120–122 and/or communication devices 140, 142, FIG. 1).

Device interfaces 230–232 also could include directional, phased array, omni-directional, optical antennas, or any combination thereof. In one embodiment, device interfaces 230–232 include phased array antennas which enable cellular communication channels to be provided to communication devices within a beam which has a dynamically-shapeable geometry with respect to the surface of the earth. Device link amplifiers 235–237 are used to amplify signals which are to be transmitted to ground devices and/or to amplify signals received from ground devices when necessary. In an alternate embodiment, amplification could be performed digitally by processor 210.

Cross-link interface 250 is used to send signals over cross-links (e.g., crosslink 115, FIG. 1) to another platform in systems where more than one platform exists which are in direct communication contact with each other. In some embodiments, multiple other platforms exist which could be linked together using multiple cross-link interfaces. In other embodiments, no other platforms exist or the platforms do not directly communicate, making cross-link interface 250 unnecessary. Memory device 240 can be used to store signals on any interface 220–222, 230–232, and/or 250 prior to providing the interface.

Buoyancy means 260 provides the ability to position platform 200 in a particular location without the use of a support structure to the ground. Buoyancy means 200 also enables platform 200 to be located at a desired location, in a preferred embodiment. For example, buoyancy means 260 could be a powered aircraft means or a lighter-than-air elevation means such as a balloon or dirigible. In a preferred embodiment, buoyancy means 200 enables platform 200 to be positioned up to any altitude where the air density allows the platform 200 to remain buoyant.

The placement of platform 200 at a high altitude enables many of the advantages of the present invention to be provided. Depending on the location of the ground devices relative to a high altitude platform, a platform would consistently have a higher angle of elevation with respect to the ground devices than a prior-art ground-based communication platform (e.g., a terrestrial cellular base station). In addition, a high-altitude platform would be better suited to communicate with a satellite at a low angle of elevation than a device on the ground would be.

Placement of platform 200 at a high altitude also facilitates spectral reuse because satellites and/or ground devices need not transmit signals at currently-required power levels in order to communicate with each other. The satellite or ground device needs only to transmit at a power level sufficient to enable signal reception by platform 200. Therefore, transmissions from ground devices would not interfere with satellite transmissions, and vice versa.

The placement of platform 200 at a high altitude also enables a communication system to employ ground devices which are capable of functions which prior-art ground devices are incapable of or which would require extra, expensive equipment to perform. The ability of the method and apparatus of the present invention to achieve each of these advantages will be described in detail below.

Figure 3:
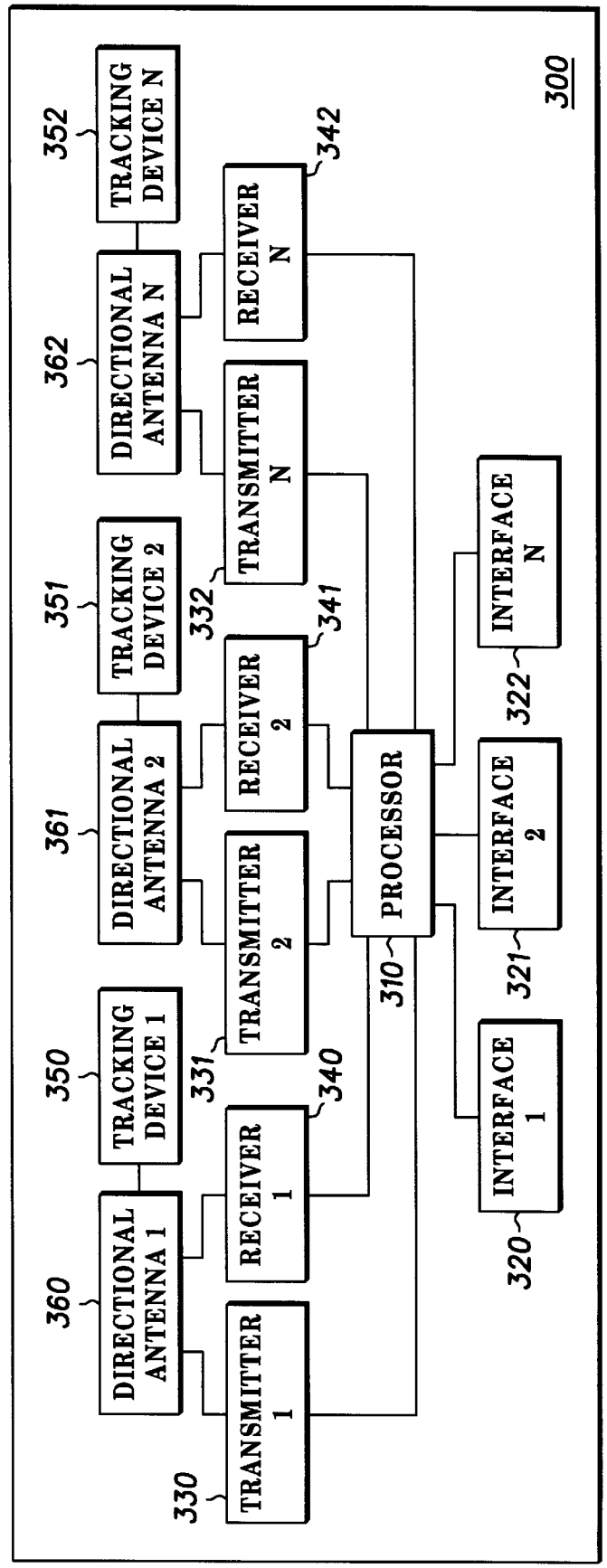
FIG. 3 illustrates a block diagram of a ground communication device in accordance with a preferred embodiment of the present invention.

FIG. 3 illustrates a block diagram of ground communication device 300 in accordance with a preferred embodiment of the present invention. In a preferred embodiment, ground device 300 includes processor 310, device interfaces 320–322, transmitters 330–332, receivers 340–342, tracking devices 350–352, and directional antennas 360–362.

In alternate embodiments, not all of these components of ground device 300 need to be present. The components present depend on the function ground device 300 is expected to perform. The various functions performed by ground device 300 will be described in detail in conjunction with FIGS. 6, 7, 10, and 11. The descriptions associated with these figures will refer to specific components in FIG. 3 which are necessary to perform the described functions. For each function described, only those components associated with the description for the function are necessary for the embodiment which performs the function.

Although FIG. 3 illustrates three each of device interfaces 320–322, transmitters 330–332, receivers 340–342, tracking devices 350–352, and directional antennas 360–362, more or fewer of these components could be used in various embodiments. For example, in some embodiments, ground communication device 300 might include only transmitters 330–332 and no receivers 340–342 or vice versa.

Processor 310 provides an interface between one or more end user devices serviced by ground device 300 and one or more communication platforms (e.g., platforms 110, 112, FIG. 1). As a simplified illustration, processor 310 might receive signals from a communication platform via receiver 340 and send those signals to an end user device, such as a personal computer, via device interface 320. Ground device 300 could provide a bi-directional interface if processor 310 also receives signals from device interface 320 and sends them to the communication platform via transmitter 330. Any suitable processor means could be used as processor 310.

With multiple transmitters 330–332 and receivers 340–342, ground device 300 can send and receive signals to and from multiple communication platforms, satellites, or other signal sources (e.g., terrestrial cellular base stations). Each receiver 340–342 and transmitter 330–332 set communicates with a communication platform or other signal source using an antenna of some type. FIG. 3 shows directional antennas 360 associated with the transmitter/receiver pairs. In addition, FIG. 3 shows tracking devices 350 which are used to orient directional antennas 360 toward the communication platform or other device with which communication is desired. In alternate embodiments, some or none of directional antennas 360–362 and/or tracking devices 350–352 would be necessary. For example, one embodiment might use an optical communication link between ground device 300 and a communication platform. In such an embodiment, optical communication equipment would be used instead of a directional antenna or tracking device. Therefore, the types of antenna interfaces used in conjunction with ground device 300 depend on the types of links maintained by ground device 300. Any type or combination of types of signal reception means and/or signal transmission means could be used, including directional, omni-directional, phased array, and/or optical interfaces.

With multiple device interfaces 320–322, ground device 300 can send and receive signals to and from multiple end user devices such as, for example, computers, telephones, televisions, monitoring/alarm systems, or any other type of device. As will be explained in detail in conjunction with FIG. 7, processor 310 can be used to combine signals from multiple end user devices in order to transmit a combined signal to a communication platform. Similarly, as will be explained in detail in conjunction with FIG. 6, processor 310 can be used to separate a combined signal received from a communication platform in order to send the separate parts of the signal to various end user devices.

In a most general sense, a communication platform such as that described herein is used to provide an interface between multiple wireless communication devices (e.g., ground devices, satellites, other platforms, and/or other devices). In one embodiment, a communication platform can provide an interface between a satellite (e.g., satellite 131, FIG. 1) and a ground device (e.g., ground device 300, FIG. 3). This general use of a communication platform in accordance with a preferred embodiment of the present invention is explained in detail in conjunction with FIG. 4. In another embodiment, a communication platform (or platforms) can be used as a backbone for a terrestrial network (e.g., cellular, PCS, local multipoint, LMDS, and/or MMDS). The use of a platform as a backbone is explained in detail in conjunction with FIG. 9. Other uses of a communication platform in accordance with the present invention are also explained in conjunction with the figures.

The method and apparatus of the present invention also can be used to reuse spectrum, which is an extremely valuable communication system commodity. Spectral reuse is provided in several ways. First, the communication platform can be used to insulate signals from areas above and below the platform so that spectrum can be reused in both areas. This can be achieved two ways: by spatial diversity and/or by using low-power transmissions. Reuse can occur via spatial diversity because communication platform antennas used to communicate with satellites will necessarily be oriented toward a different direction than antennas used to communicate with ground devices. Because of the differential orientation of the antennas, frequencies used to communicate with satellites can be reused to communicate with ground devices, and vice versa. Although the description of FIG. 4 concentrates on reusing spectrum on links which are spatially diverse because one link is with a satellite and another link is with a ground device, spectral reuse employing this concept can be used on any links supported by the communication platform where the source and destination of a signal or signals are spatially diverse (e.g., including ground-to-platform-to-ground or satellite-to-platform-to-satellite communication links).

Low-power spectral reuse can occur when either or both ground devices and satellites transmit signals destined for each other at power levels which are insufficient to enable direct reception by the destination device. These power levels would be sufficient for signal reception by the communication platform. In either case, spatial diversity or low-power transmissions, spectrum used by satellites would not interfere with spectrum used by ground devices and vice versa. These modes of spectral reuse are described in conjunction with FIG. 4.

Another way that the method and apparatus of the present invention provides spectral reuse also involves spatial diversity and will be described in conjunction with FIG. 11.

Figure 4:
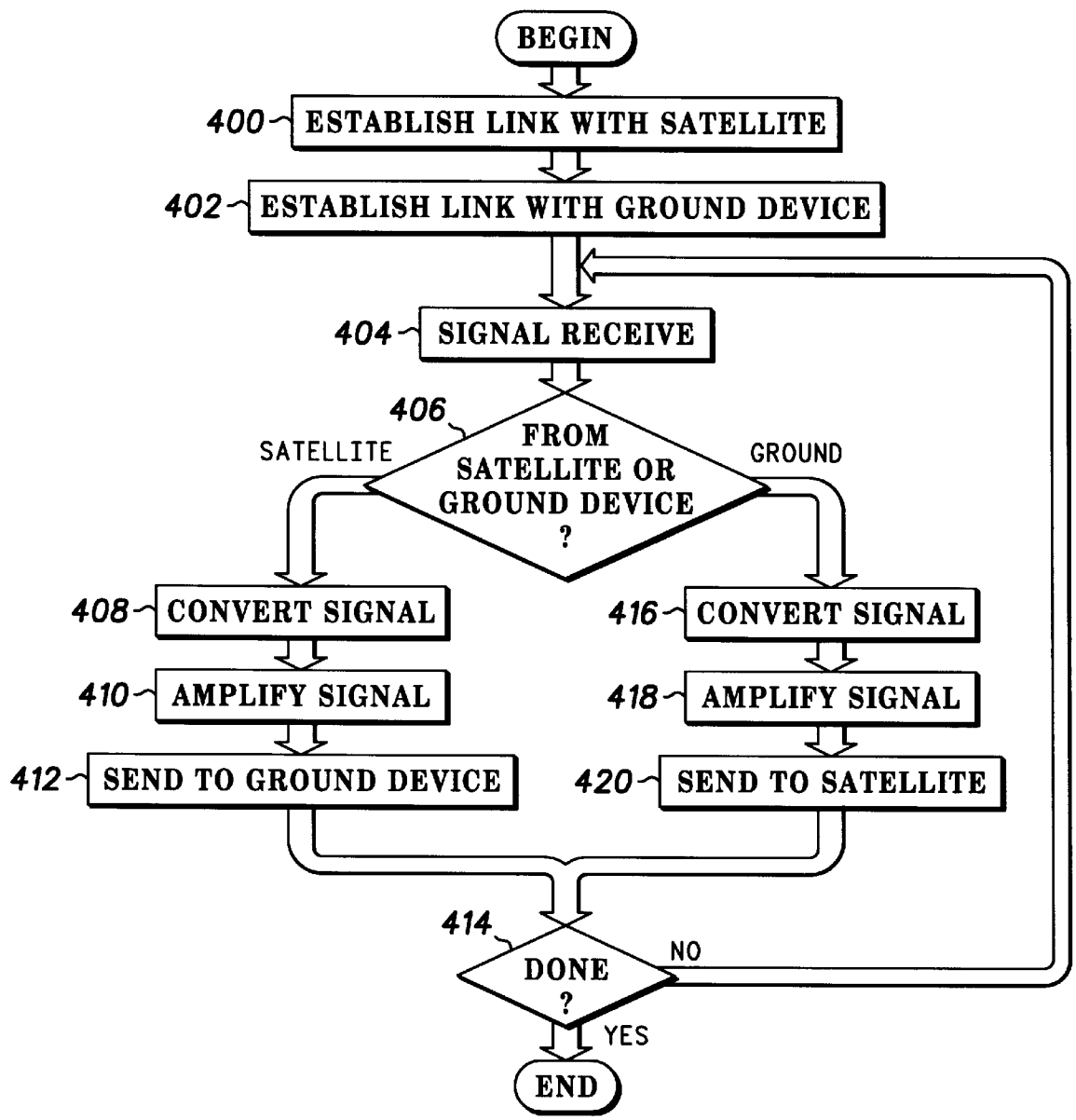
FIG. 4 illustrates a flowchart of a method for a communication platform to provide an interface between a satellite and a ground device in accordance with a preferred embodiment of the present invention.

FIG. 4 illustrates a flowchart of a method for a communication platform to provide an interface between a satellite and a ground device in accordance with a preferred embodiment of the present invention. The method begins, in step 400, by establishing a first link (e.g., link 135, FIG. 1) with the satellite, where satellite-to-platform signals will be communicated over the first link. For example, the first link could be established via satellite interface 220 (FIG. 2). In a preferred embodiment, the first link is an optical link between the platform and the satellite. An optical link is preferred because the capacity of an optical link often can exceed the capacity of a typical RF link. Although optical links are undesirable in some applications because they typically suffer from strict line-of-sight requirements, an optical link between the platform and a satellite would be highly feasible because of the lack of obstructions between the two devices in benign radio propagation conditions (i.e., where conditions such as rain do not obscure the link). In alternate embodiments, any type of link could be used, including an RF or optical link. The satellite-to-platform link could be a bi-directional link or a one-way link in either direction. Preferably, the link is bi-directional.

In step 402, a second link (e.g., link 125 or 145, FIG. 1) is established with a ground device, where ground-to-platform signals will be communicated over the second link. For example, the second link could be established via device interface 230 (FIG. 2). In a preferred embodiment, the second link is an RF link between the platform and the ground device. An RF link, as opposed to an optical link, is desirable between the platform and the ground device because of the likelihood that obstructions such as weather, foliage, and buildings will block the direct line-of-sight between the ground device and the platform. In alternate embodiments, however, optical links could also be used. Such links would be desirable where the likelihood of obstructions is low. The ground-to-platform link could be a bi-directional link or a one-way link in either direction. Preferably, the link is bi-directional.

Steps 404–420 enable the platform to provide an interface between the satellite and the ground device by processing the satellite-to-platform signals and the ground-to-platform signals. In step 404, the platform receives a signal from either the satellite or the ground device. A determination is made, in step 406, whether the signal is received from the satellite or the ground device. In a preferred embodiment, this determination will be automatically made based on the platform component which receives the signal. For example, where a satellite interface (e.g., satellite interface 220, FIG. 2) receives a signal, the presumption could be that the signal is a satellite signal. In other words, the illustration of step 404 is for ease of explanation and an actual determination of the signal source might not be necessary.

As used herein, a signal traveling from a satellite through the communication platform and to a ground device is sent a "downlink" from the satellite to the platform and another downlink from the platform to the ground device. Similarly, a signal traveling from a ground device through the communication platform and to a satellite is send on an "uplink" from the ground device to the platform and another uplink from the platform to the satellite.

If the signal is received from a satellite over a first downlink between the satellite and the platform, steps 408–414 are performed. In step 408, the signal is converted to another format for retransmission over a second downlink between the platform and a destination ground device, if necessary (e.g., using processor 210, FIG. 2). For example, in a preferred embodiment, where the received signal is an optical signal, the signal format could be changed to a format appropriate for RF retransmission. In other embodiments, the received signal and the transmitted signal could be of the same type (e.g., optical), and the only conversion necessary is to change one or more parameters of the channel (e.g., transmission frequency). In still other embodiments, no conversion of the signal might be necessary.

In one embodiment of the invention which provides spectral reuse via low-power transmissions, the platform can prepare the signals for retransmission by amplifying those signals which were transmitted by the satellite at a power level which is insufficient for direct reception by communication devices, but which is sufficient for reception by the platform because of the altitude of the platform. Low-power transmissions such as these could be intentional as explained previously, for example, where spectral reuse is desired. In step 410, the satellite signal is amplified (e.g., using amplifier 235 or processor 210, FIG. 2) as needed. Amplification could be performed either in the analog or digital form.

In another embodiment of the invention which provides spectral reuse via spatial diversity, the frequency used on the first downlink from the satellite to the communication platform can be reused on the second downlink from the platform to the destination ground device or on another downlink to any other ground device. The step 410 of amplifying the signal may or may not be necessary in such an embodiment In step 412, the signal is sent to the ground device over the ground-to-platform link (e.g., via device interface 230, FIG. 2). A determination is then made, in step 414, whether the data transfer is done. If not, then the procedure iterates as shown in FIG. 4. If so, then the procedure ends.

Referring again to step 406, when a determination is made that the signal is received from a ground device over a first uplink between the ground device and the platform, steps 416–420 are performed. In step 416, the signal is converted to another format for retransmission over a second uplink between the platform and a destination satellite, if necessary (e.g., using processor 210, FIG. 2). For example, in a preferred embodiment, where the received signal is an RF signal, the signal format could be changed to a format appropriate for optical retransmission. In other embodiments, the received signal and the transmitted signal could be of the same type (e.g., RF), and the only conversion necessary is to change one or more parameters of the channel (e.g., transmission frequency or timeslot). In still other embodiments, no conversion of the signal might be necessary.

Similar to step 410, step 418 is performed in an embodiment which provides spectral reuse via low-power transmissions (i.e., where the ground device transmitted signals an a power level which was insufficient for direct reception by a satellite, but which is sufficient for reception by the platform because of the altitude of the platform). Once again, the platform can prepare the signals for retransmission by amplifying the signals (e.g., using amplifier 225 or processor 210, FIG. 2) in either the analog or digital form.

In another embodiment of the invention which provides spectral reuse via spatial diversity, the frequency used on the first uplink from the ground device to the communication platform can be reused on the second uplink from the platform to the destination satellite or on another uplink to any other satellite. The step 418 of amplifying the signal may or may not be necessary in such an embodiment.

In step 420, the signal is sent to the satellite over the satellite-to-platform link (e.g., via satellite interface 220, FIG. 2). A determination is made, in step 414, whether the data transfer is done. If not, the procedure iterates as shown in FIG. 4. If so, then the procedure ends.

Although FIG. 4 illustrates a method for interfacing a single satellite and ground device, multiple satellites and ground devices could be interfaced using the method. For example, multiple links to each type of source or destination could be established (e.g., using satellite interfaces 220–222 and/or device interfaces 230–232, FIG. 2). In addition, the platform could be used to combine signals from multiple sources (e.g., multiple ground devices or satellites) and transmit or broadcast the combined signal to its destination. Some of these variations will be described in detail below.

As stated previously, prior-art multi-receiver ground devices must have dedicated directional antennas and, where necessary, tracking devices for each satellite or other signal source with which the ground device wishes to communicate. This adds to the expense of prior-art ground devices and limits their flexibility.

As will be described in detail in conjunction with FIGS. 5–8, the method and apparatus of the present invention enables a ground device to receive signals from multiple, spatially separated sources using only a single antenna. This is achieved by using a communication platform to combine multiple signals and to send a combined signal to the ground device. Thus, in order to receive signals from multiple sources, the ground device need only have a communication link with the communication platform. In addition, when a ground device wishes to receive a signal from an additional source, the ground device need not be physically modified as was required in the prior art. Instead, the ground device would make its desire known to the communication platform and the communication platform would then combine the new signal in with the combined signal which the platform sends to the ground device.

Another advantage provided is that the ground device can send a combined signal to the platform which includes information intended for multiple destinations. The platform can then separate the combined signal and send the information to each destination separately. In essence, antennas and otherwise expensive equipment are shifted from the ground device to the communication platform, yielding inexpensive ground equipment which is extremely flexible.

Figure 5:
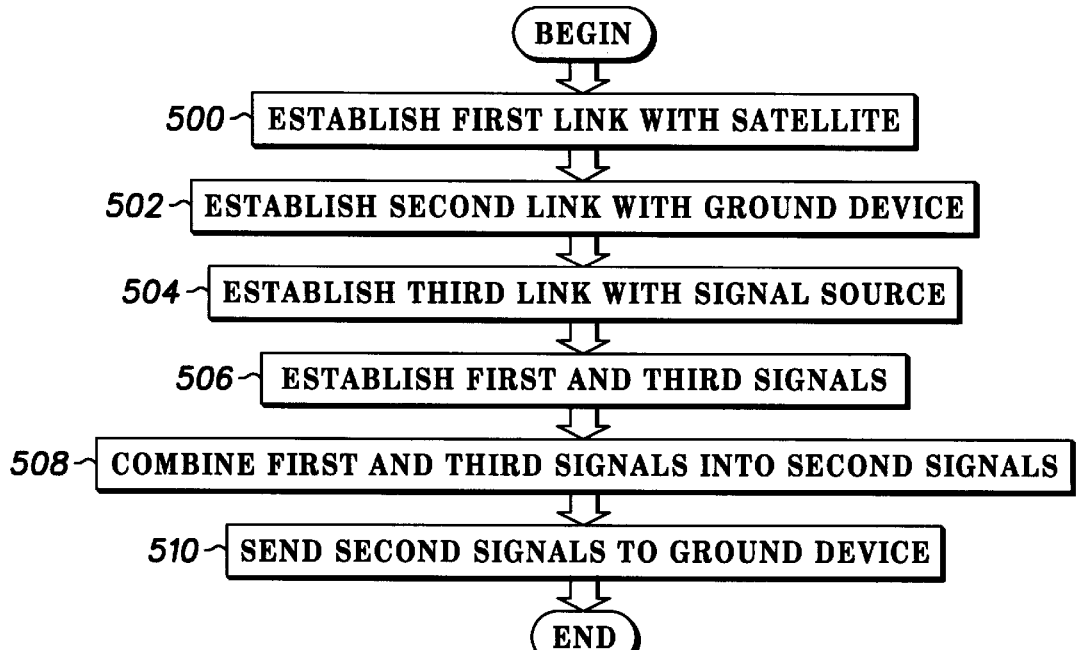
FIG. 5 illustrates a flowchart of a method for a communication platform to combine signals from multiple sources and provide the combined signal to a ground device in accordance with a preferred embodiment of the present invention.
Figure 6:
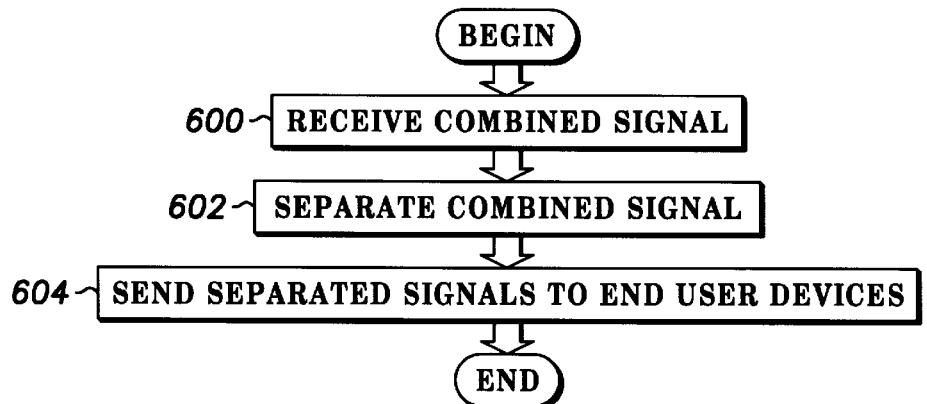
FIG. 6 illustrates a flowchart of a method for a ground device to receive a combined signal from a communication platform and separate the combined signal in accordance with a preferred embodiment of the present invention.
Figure 7:
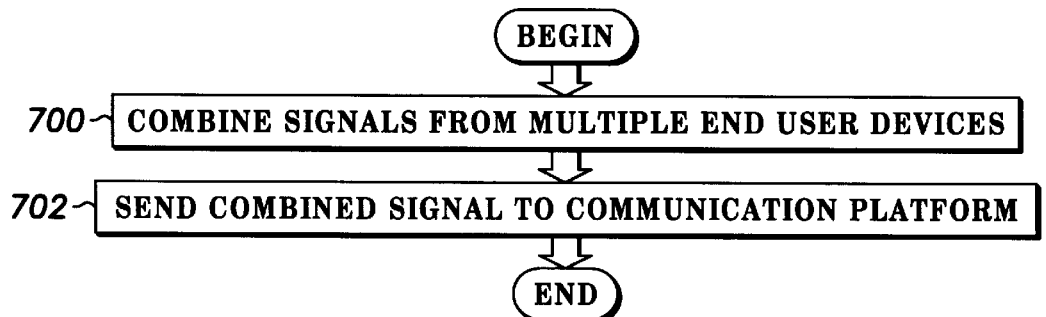
FIG. 7 illustrates a flowchart of a method for a ground device to combine and send signals to a communication platform in accordance with a preferred embodiment of the present invention.
Figure 8:
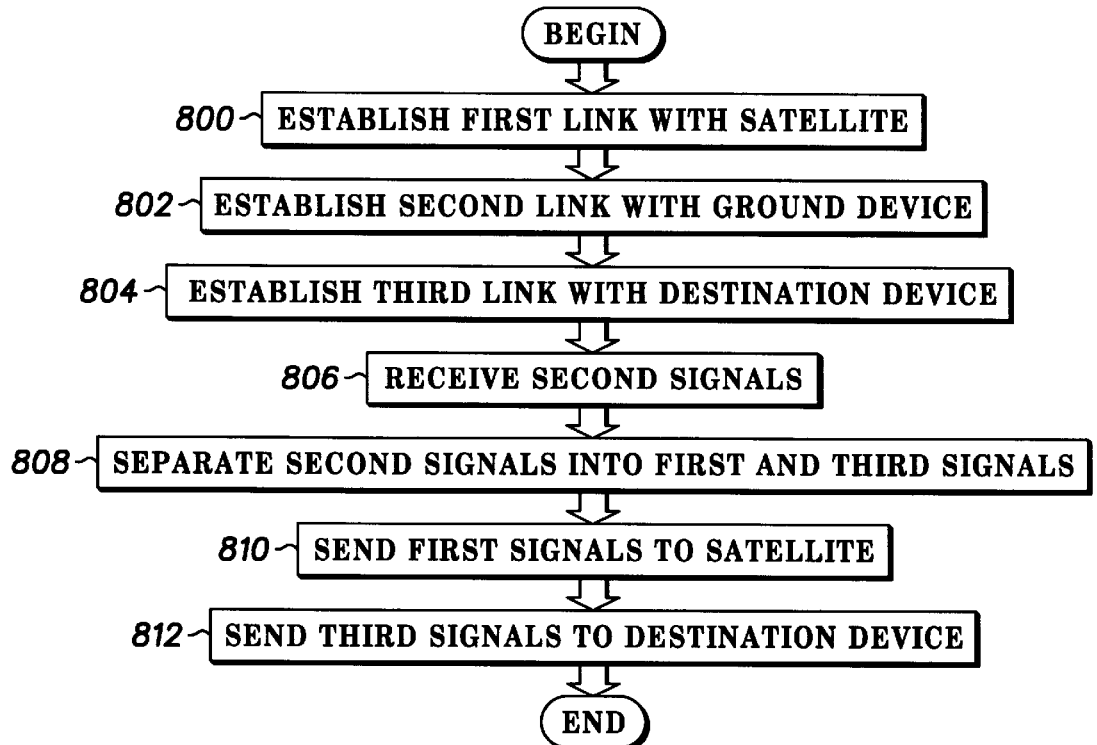
FIG. 8 illustrates a flowchart of a method for a communication platform to separate signals within a combined ground device signal and send the separated signals to multiple destinations in accordance with a preferred embodiment of the present invention.

FIGS. 5 and 8 describe functions performed by a communication platform to achieve these advantages and FIGS. 6 and 7 describe functions performed by a ground device.

FIG. 5 illustrates a flowchart of a method for a communication platform to combine signals from multiple sources and provide the combined signal to a ground device in accordance with a preferred embodiment of the present invention. By performing this method, the communication platform facilitates communication between a satellite, one or more other signal sources, and a communication device located on or near the earth's surface. The method is desirably performed by a communication platform such as the communication platform described in conjunction with FIG. 2.

The method begins, in step 500, by the communication platform establishing a first link with a satellite over which signals can be communicated (e.g., via satellite interface 220, FIG. 2). The link could be, for example, an RF or optical link. In step 502, a second link is established by the communication platform with the communication device (e.g., via device interface 230, FIG. 2). The second link also could be, for example, an RF or optical link over which signals can be communicated.

In step 504, the communication platform establishes a third link with another signal source (e.g., via satellite interface 221, device interface 231, or crosslink interface 250, FIG. 2). The other signal source could be another satellite, an airborne, non-orbiting signal source, or a signal source located proximate to the surface of the earth (e.g., a cellular base station). In a preferred embodiment, the communication platform can establish additional links with one or more other signal sources as well. Also in a preferred embodiment, the communication platform can orient its signal interfaces toward multiple sources which are spatially separated, thus enabling spectral reuse of common spectrum shared by the multiple sources.

In step 506, the communication platform receives first signals from the satellite and third signals from the other signal source. If necessary, the communication platform can demultiplex the first and third signals. The communication platform then combines the signals, in step 508, into the second signals (e.g., using platform processor 210, FIG. 2). Any method could be used to combine the signals. For example, the signals could be time and/or frequency division multiplexed or could be spread spectrum. In a preferred embodiment, the communication platform could receive and combine any number of signals from various signal sources.

In step 510, the communication platform sends the combined second signals to the communication device over the second link. The procedure then ends.

By performing the method shown in FIG. 5, the communication device provides an interface between the satellite and the communication device by processing the first, second, and third signals.

FIG. 6 illustrates a flowchart of a method for a ground device to receive a combined signal from a communication platform and separate the combined signal in accordance with a preferred embodiment of the present invention. The method is desirably performed by a ground device such as the ground device described in conjunction with FIG. 3.

The method begins, in step 600, when the ground device receives (e.g., via directional antenna 360 and receiver 340, FIG. 3) a combined signal from a communication platform which combined the signal in accordance with the method described in conjunction with FIG. 5. The combined signal could contain information from any number of signal sources.

In step 602, the ground device separates the combined signal into multiple separate signals (e.g., using processor 310, FIG. 3). The method of separating the signals corresponds to the method used by the communication platform to combine the signals. Each of the separate signals represents a signal received by the communication platform from one of the signal sources. In step 604, the ground device sends the separate signals to their destinations (e.g., via interface 320–322). For example, a separate signal could be destined for a portable telephone, a facsimile device, a personal computer, a television set, a memory device, or a home monitoring system. The procedure then ends.

FIG. 7 illustrates a flowchart of a method for a ground device to combine and send signals to a communication platform in accordance with a preferred embodiment of the present invention. The method is desirably performed by a ground device such as the ground device described in conjunction with FIG. 3. The method corresponds to the method described in conjunction with FIG. 6, except the signals are exchanged in the opposite direction (i.e., from the ground device to the communication platform).

The method begins, in step 700, when the ground device receives (e.g., via interface 320–322, FIG. 3) and combines (e.g., using processor 310, FIG. 3) multiple signals from multiple sources. For example, the ground device could receive signals from a portable telephone, a facsimile device, a personal computer, a television set, a memory device, or a home monitoring system. Any method could be used to combine the signals. For example, the signals could be time and/or frequency division multiplexed or could be spread spectrum. In a preferred embodiment, the ground device could receive and combine any number of signals from various end user devices.

In step 702, the ground device sends (e.g., via transmitter 330 and directional antenna 360, FIG. 3) the combined signal to the communication platform so that the communication platform can separate the combined signal and route separated signals to various receiving devices. These steps performed by the communication platform are described in more detail in conjunction with FIG. 8. After sending the combined signal, the procedure ends.

FIG. 8 illustrates a flowchart of a method for a communication platform to separate signals within a combined ground device signal and send the separated signals to multiple destinations in accordance with a preferred embodiment of the present invention. The method is desirably performed by a communication platform such as the communication platform described in conjunction with FIG. 2. The method corresponds to the method described in conjunction with FIG. 5, except the signals are exchanged in the opposite direction (i.e., from the ground device to the communication platform).

The method begins, in step 800, when the communication platform establishes a first link with a first destination device over which first signals can be communicated (e.g., via satellite interface 220, crosslink interface 250, or device interface 230, FIG. 2). In a preferred embodiment, the first destination device is a communication satellite, although the first destination could be any device capable of receiving signals from the communication platform. In step 802, the communication platform establishes a second link with a ground device (e.g., via device interface 231, FIG. 2). In step 804 the communication platform establishes a third link with at least a second destination device over which third signals could be communicated (e.g., via satellite interface 221, crosslink interface 250, or device interface 232, FIG. 2). The destination device could be, for example, a satellite, a non-orbiting airborne device, or a device located on or near the surface of the earth. The links established in steps 800–804 could be RF or optical, for example.

The communication platform receives, in step 806, a combined signal over the second link from a ground device, where the combined signal was desirably created by the ground device in accordance with the method described in conjunction with FIG. 7. The communication platform then separates (or demultiplexes) the combined signal, in step 808, into the first and third signals which will be sent to the first destination device, the second destination device, and other signals, if any, destined for other destination devices. The method of separating the signals corresponds to the method the ground device used to combine the signals (e.g., demultiplexing).

In step 810, the communication platform sends the first signals to the first destination device over the first link and, in step 812, sends the third signals to the second destination device over the third link. The communication platform can multiplex the first and third signals with other information, if necessary, prior to sending them. If additional signals were also separated from the combined signal, these additional signals are sent to other destination devices. Any of the signals could be stored or modified prior to being sent. The procedure then ends.

The method and apparatus of the present invention is also extremely useful in providing high-speed interface between ground devices. For example, as will be described in conjunction with FIG. 9, the method and apparatus can be used to provide a high-speed network-to-network interface.

Figure 9:
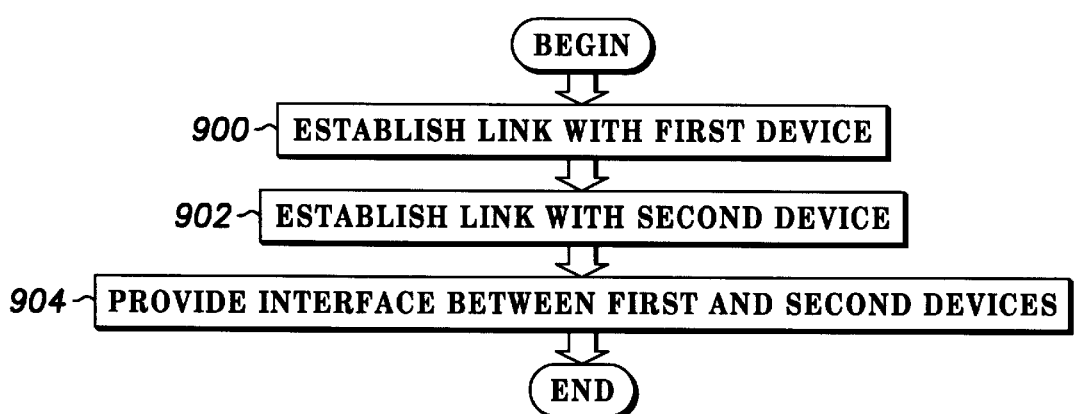
FIG. 9 illustrates a flowchart of a method for a communication platform to provide an interface between multiple terrestrial devices in accordance with a preferred embodiment of the present invention.

FIG. 9 illustrates a flowchart of a method for a communication platform to provide an interface between multiple terrestrial devices in accordance with a preferred embodiment of the present invention. The method is desirably performed by a communication platform such as the communication platform described in conjunction with FIG. 2. The method enables one or more communication platforms to operate as a backbone for a terrestrial network.

The method begins, in step 900, by establishing a first link with a first device located at or near the surface of the earth (e.g., via device interface 230, FIG. 2). For example, the device could be a ground device or a network (e.g., a local area network (LAN) or the Internet). In step 902, the communication platform establishes a second link with a second device (e.g., via device interface 231, FIG. 2). The second device could be a ground device or another network, for example. The first and second links could be, for example, RF or optical links or a combination thereof.

In step 904, the communication platform provides an interface between the first device and the second device by transferring unidirectional and/or bi-directional messages between the two devices. Transfer of the signals could also involve performance of a processing step (e.g., using platform processor 210, FIG. 2). The procedure then ends.

The method described in conjunction with FIG. 9 could be used provide an interface between numerous different types of devices. For example, a platform (or platforms) using the method could be used as a backbone for a terrestrial network, providing interconnections between terrestrial nodes which are not end user devices. In prior-art systems, terrestrial nodes were interconnected using terrestrial connections (e.g., terrestrial microwave links) or leased lines. The method and apparatus of the present invention eliminates the need using such terrestrial connections or leased lines. For example, the platform could be used to interface a base station (e.g., a PCS, microcellular, or cellular base station) with a base station controller (e.g., a radio port controller or a mobile terminal switching office (MTSO)) designated to support those base stations. The communication platform would receive signals from the base station (e.g., via device interface 230, FIG. 2) and cause the signals to be sent to the base station controller (e.g., via device interface 231, FIG. 2) and vice versa.

As illustrated in FIG. 1, a communication system can include multiple communication platforms. This enables a ground device to select a platform which provides the ground device with the best communications. For example, several communication platforms might be servicing an area within which a ground device is located. Obstructions or range limitations would likely make one of the communication platforms more desirable for the ground device to use. The ground device would select that platform for communications.

Figure 10:
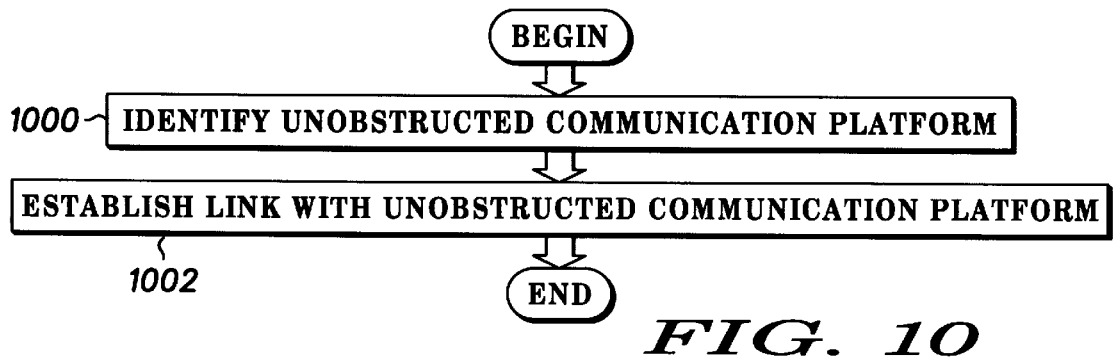
FIG. 10 illustrates a flowchart of a method for a ground device to use spatial diversity to communicate with an available communication platform in accordance with a preferred embodiment of the present invention.

FIG. 10 illustrates a flowchart of a method for a ground device to use spatial diversity to communicate with an available communication platform in accordance with a preferred embodiment of the present invention. The method is desirably performed by a ground device such as the ground device described in conjunction with FIG. 3. The method is useful in a communication system where multiple communication platforms could be accessible to a ground device at the same time. The method is especially useful where not all of the potentially accessible communication platforms can support a communication link with the ground device due to obstructions between the ground device and the communication platforms. In a preferred embodiment, the communication platforms are located at high altitudes and are positioned at spatially diverse locations.

The method begins, in step 1000, when the ground device identifies an unobstructed communication platform of the multiple communication platforms (e.g., communication platform 200, FIG. 2). The unobstructed communication platform will be a platform with which the ground device can establish a communication link. In other words, no obstruction exists between the ground device and the communication platform which precludes a link from being established. For a system which uses optical links, any obstruction which blocks a direct line-of-sight between the ground device and the communication platform will preclude a link from being formed. For a system which uses RF links, any obstruction which causes the signal to fall below an allowable link margin will preclude a link from being formed. Identifying an unobstructed communication platform, in a preferred embodiment, assumes that the ground device knows the approximate locations of potential communication platforms and can make an assessment of whether an obstruction exists between the ground device and each platform.

After identifying an unobstructed communication platform, the ground device, in step 1002, establishes a link with the communication platform (e.g., via directional antenna 360 and receiver 340, FIG. 3) in order to transfer data over the link. The link could be, for example, an RF or optical link. Once the link is established, communications can occur between the ground device and the communication platform. The procedure then ends.

As explained previously, the method and apparatus of the present invention can be used to reuse spectrum in at least two ways. In one application, directional antennas associated with either or both the ground device and the communication platform can be oriented toward spatially diverse satellites and/or other signal sources. Because of the spatial diversity, the satellites and/or other signal sources can use common portions of spectrum.

Figure 11:
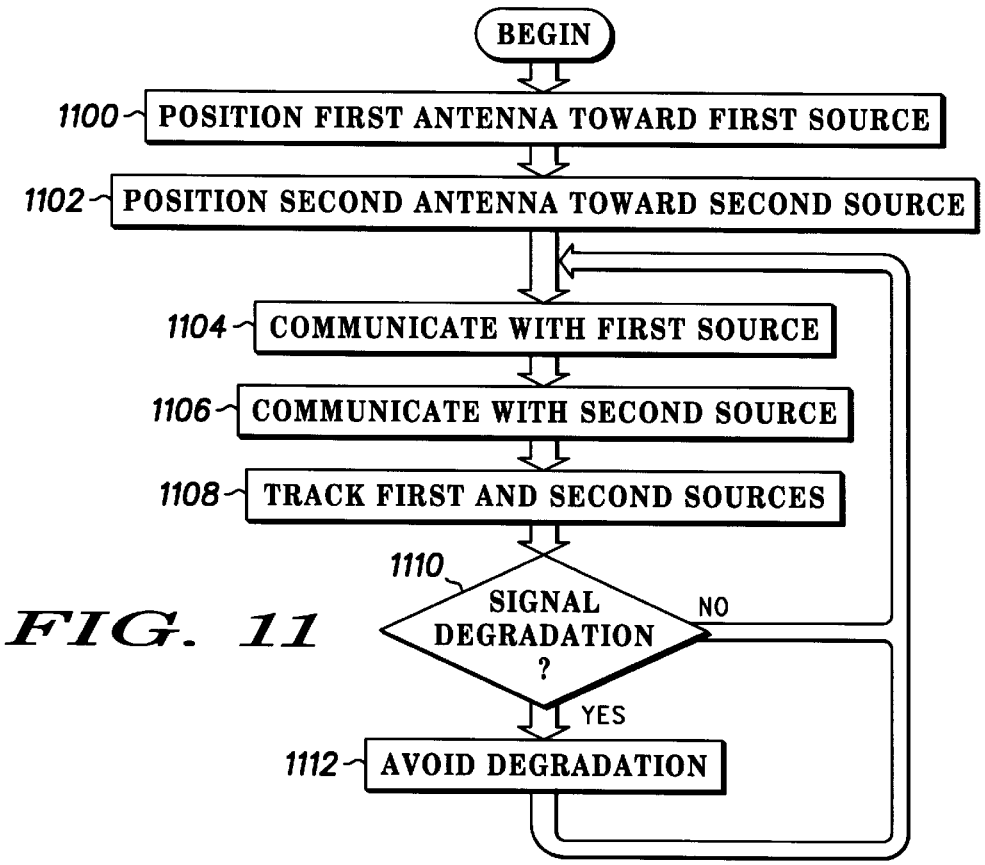
FIG. 11 illustrates a flowchart of a method for a ground device to communicate with a communication platform and another device in accordance with a preferred embodiment of the present invention.

FIG. 11 illustrates a flowchart of a method for a ground device to communicate with a communication platform (e.g., platform 200, FIG. 2) and another device in accordance with a preferred embodiment of the present invention. The method enables spectral reuse by having the ground device track and communicate with signal sources which are located in spatially-diverse locations for at least a period of time. The method is desirably performed by a ground device such as the ground device described in conjunction with FIG. 3. Ground device operations are desirably controlled by a processor (e.g., processor 310, FIG. 3). The method is useful when a ground device communicates with a communication platform but also desires to communicate with another signal source.

The method begins, in step 1100, when the ground device positions a first directional antenna (e.g., antenna 360, FIG. 3) toward a first signal source (e.g., toward a communication platform). In step 1102, the ground device positions a second directional antenna (e.g., antenna 361, FIG. 3) toward a second signal source (e.g., a satellite, another communication platform, a cellular base station, or a microwave antenna).

In step 1104, the ground device communicates with the first signal source over a link between the ground device and the first signal source. In step 1106, the ground device communicates with the second signal source over a link between the ground device and the second signal source. Steps 1104 and 1106 can support bi-directional communications or one-way communications in either direction. When the first signals and the second signals use an overlapping portion of spectrum, the first directional antenna and the second directional antenna can receive the first signals and the second signals without interference from each other because of spatial diversity between the first antenna position and the second antenna position.

In a preferred embodiment, the first and second signal sources are tracked (e.g., using tracking devices 350, 351, FIG. 3), in step 1108, during a period of time when the ground device desires to maintain communications. In alternate embodiments, where either or both the first and second signal sources are relatively stationary, step 1108 would not be necessary for the stationary source.

In step 1110, in a preferred embodiment, a determination is made whether communication with either signal source will result in unacceptable signal degradation. For example, one occurrence which could cause unacceptable signal degradation is that interference could occur on either or both links. This could occur, for example, where the second signal source might be a LEO satellite. The ground device might track the satellite to a position where the satellite and the communication platform are co-linear. Unacceptable signal degradation also could occur, for example, where a link has a high bit or frame error rate or a low signal power.

When unacceptable signal degradation will occur, then the ground station can avoid the signal degradation in step 112 and continue the procedure as shown in FIG. 11. Avoiding the signal degradation could entail, for example, ceasing to communicate over the link until the threat of degradation is passed, changing the parameters (e.g., the frequency) of the communication so that degradation will be minimized or will not be present, or switching communications to another non-interfering satellite or other device. If no degradation is known, then the procedure iterates as shown in FIG. 11. In another example, the ground device might track the satellite to a position where the satellite and a GEO satellite are co-linear. The ground device could avoid signal degradation due to interference with the GEO satellite as described above.

As explained previously, to provide a fully-connected network, a communication system would need enough satellites to provide LOS between satellites. A large number of satellites increases the start-up and operational costs of the system. Typically, a fully-connected satellite network is not possible during early stages of deployment because not enough satellites are in orbit to provide interconnectivity.

As will be explained in conjunction with FIG. 12, the apparatus and method of the present invention enables communication services using a constellation having a smaller number of satellites or even no satellites. In addition, the apparatus and method enables communication devices and/or satellites with no LOS or hardwired connections to communicate with each other without any significant delays.

Figure 12:
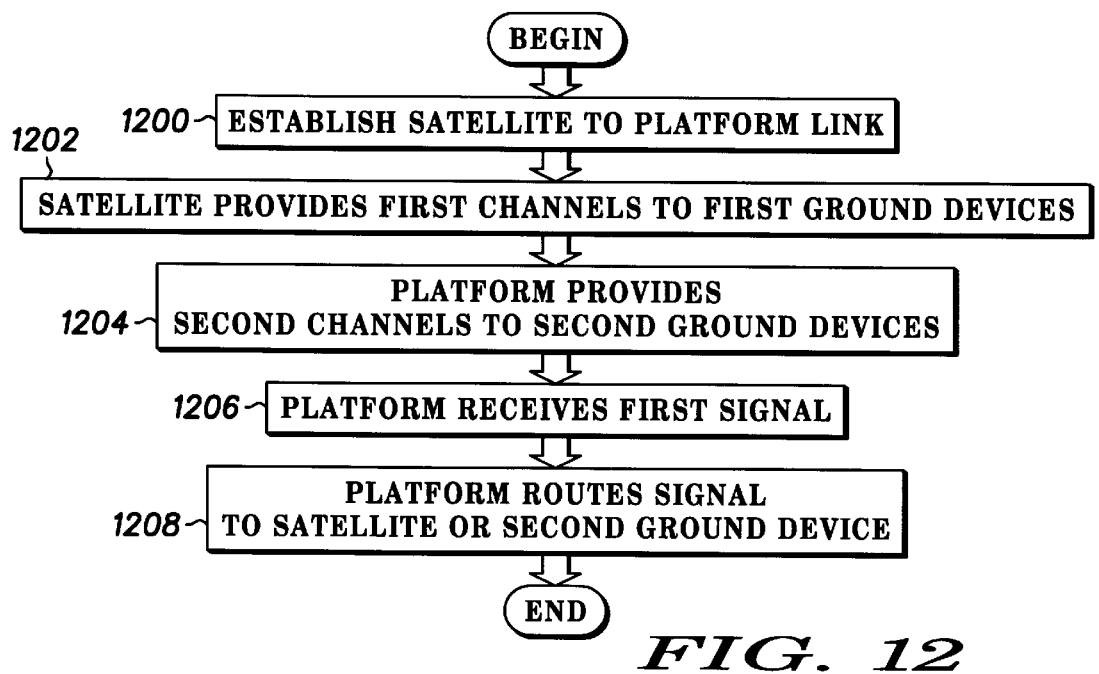
FIG. 12 illustrates a flowchart of a method for providing communication channels to sets of communication devices using a satellite and a communication platform in accordance with a preferred embodiment of the present invention.

FIG. 12 illustrates a flowchart of a method for providing communication channels to sets of communication devices using a satellite and a communication platform in accordance with a preferred embodiment of the present invention. The method is useful where a satellite provides communications capabilities to a first set of communication devices and a communication platform provides communications capabilities to a second set of communication devices. The first and second sets of communication devices could be located in the same or different geographical areas. In the former case, the communication platform could be used to provide increased capacity to the area. In the latter case, the communication platform could be used to provide links to communication devices which are out of communication range of the satellite.

The method begins, in step 1200, by establishing a link between the satellite and the communication platform (e.g., via satellite interface 220, FIG. 2). This link could be an RF or optical link, for example. In addition, the link could be a direct link between the two devices, or could be a link through any number of intermediate devices (e.g., other satellites or ground devices).

In step 1202, the satellite provides first channels to a first set of communication devices. In step 1204, the communication platform provides second channels to a second set of communication devices (e.g., via device interface 230, FIG. 2). The first and second channels could be provided, for example, within cellular communication beams projected onto the surface of the earth.

In step 1206, the communication platform receives signals from the second communication devices. The platform then evaluates routing information and, where the destination is one of the first set of communication devices, the platform routes those signals, in step 1208, to the satellite over the link between the satellite and the communication platform. The satellite would then deliver the signals to the destination communication devices. Similarly, the satellite could receive signals from the first set of communication devices and route the signals to the communication platform for delivery by the platform to the second set of communication devices. The procedure then ends.

The communication platform described herein can be used in additional applications as will be described below. For example, the platform could be used to bridge communications between two satellites or other devices which are not in communication range of each other but which are both in communication range of the communication platform. A system which utilizes the communication platform in such a manner is described in conjunction with FIG. 13.

Figure 13:
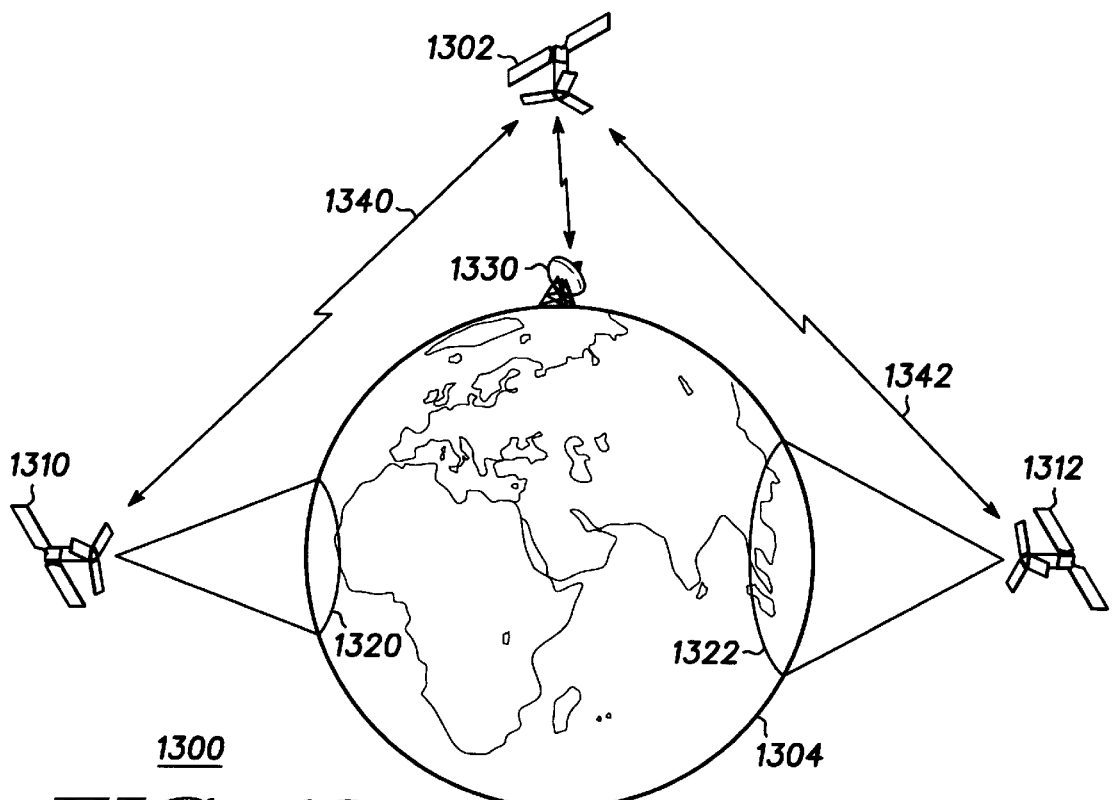
FIG. 13 illustrates another perspective of a communication system in accordance with a preferred embodiment of the present invention.

FIG. 13 illustrates another perspective of a communication system in accordance with a preferred embodiment of the present invention. Communication system 1300 includes at least one communication platform 1302 and multiple satellites 1310, 1312. Satellites 1310, 1312 have communications coverage areas 1320, 1322, respectively, on the surface of the earth 1304. Within these coverage areas 1320, 1322, satellites 1310, 1312 can provide communication services to communication devices. Occasionally, a communication device within coverage area 1320 might wish to communicate with a communication device within coverage area 1322. Unless satellites 1310, 1312 are within communication range (e.g., direct line-of-sight) of each other, a direct link between the satellites cannot be established.

Communication platform 1302 is used to bridge communications between satellites 1310 and 1312. In a preferred embodiment, communication platform 1302 establishes a direct link 1340, 1342 with both satellites. In an alternate embodiment, an indirect link could be established through any number of other satellites or ground devices, for example. Via communication platform 1302, signals from satellite 1310 to satellite 1312 can be transferred, even if satellites 1310, 1312 are not within communication range of each other. Signals also could be transferred from satellite 1312 to satellite 1310 via communication platform 1302.

Communication platform 1302 can also provide signals to a communication device 1330 within communication range of communication platform 1302. This could be useful, for example, where communication device 1330 is located in an area where it is unable to establish a link with either communication satellite 1310 or 1312 due to obstructions between communication device 1330 and communication satellites 1310, 1312. Alternatively, communication device 1330 might be unable to establish direct communications with a communication satellite 1310, 1312 because the satellite is located at an elevation angle with respect to the location of communication device 1330 such that the satellite is not within a line-of sight or communication range of the communication device.

Figure 14:
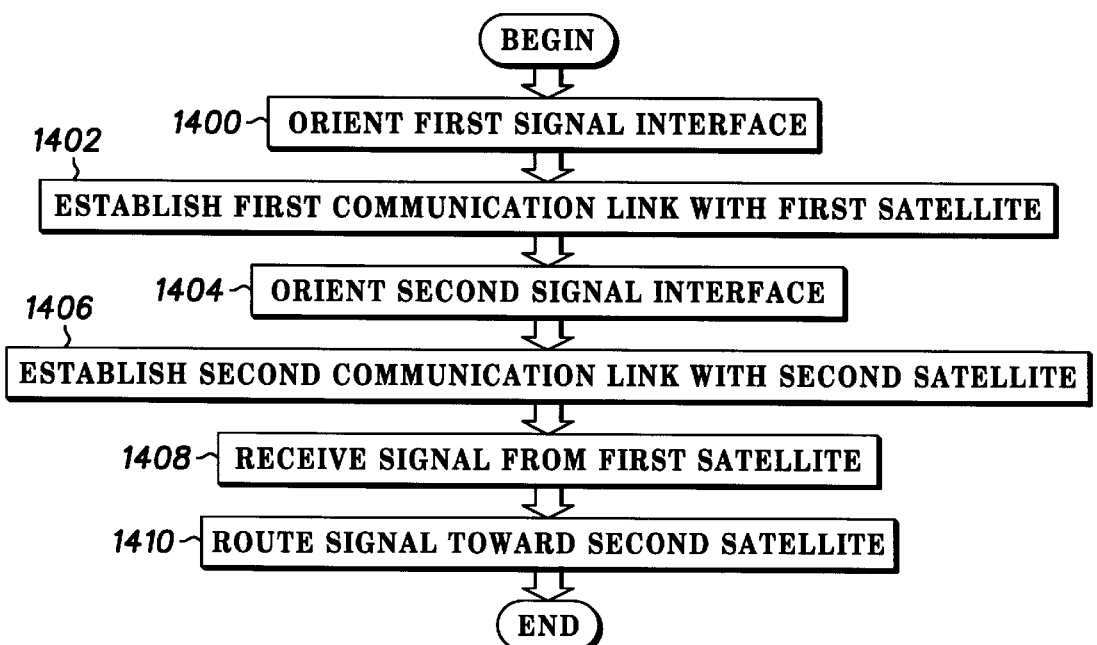
FIG. 14 illustrates a flowchart of a method for providing an interface between satellites in accordance with a preferred embodiment of the present invention.

FIG. 14 illustrates a flowchart of a method for providing an interface between satellites in accordance with a preferred embodiment of the present invention. The method is performed by a communication platform in a system such as the system described in conjunction with FIG. 13. The interface between the satellites can be maintained during at least a period of time when the satellites are not within a line-of-sight or communication range of each other, although it also can be maintained at other times.

The method begins, in step 1400, by orienting a first signal interface (e.g., satellite interface 220, FIG. 2) toward a first satellite (e.g., satellite 1310, FIG. 13). In step 1402, the communication platform establishes a first communication link with the first satellite. In step 1404, the communication platform orients a second signal interface (e.g., satellite interface 221, FIG. 2) toward a second satellite (e.g., satellite 1312, FIG. 13). In step 1406, the communication platform establishes a second communication link with the second satellite. The first and second communication links could be, for example, RF or optical communication links.

In step 1408, the communication platform receives a signal from the first satellite via the first signal interface.

After evaluating routing information associated with the signal and determining that the signal is destined for the second satellite or a communication device serviced by the second satellite, the communication platform routes the signal to the second satellite via the second signal interface in step 1410. If the routing information indicates that the signal destination is a communication device serviced by the communication platform, then the communication platform routes the signal to the communication device (e.g., via device interface 230, FIG. 2). The procedure then ends.

As explained previously, the method and apparatus of the present invention can also take advantage of the spatial diversity between satellites in order to enable spectral reuse. Because of the spatial separation of satellites and the ability of the communication platform to receive signals from spatially separated sources, the satellites would be able to transmit signals to the communication platform using common portions of spectrum.

The communication platform of the present invention can also be used in sensing applications. The ability of prior-art sensing satellites to observe phenomenon to a high level of accuracy is limited by the distance of the satellites from the phenomenon and/or obstructions which exist between the satellite and the phenomenon. More expensive and heavier sensing equipment can be used to enhance accuracy, but only to the limit of current technology.

The proximity of the communication platform to the surface of the earth makes it excellent to provide sensory information using less expensive equipment. A system which utilizes the communication platform in such a manner is described in conjunction with FIG. 15.

Figure 15:
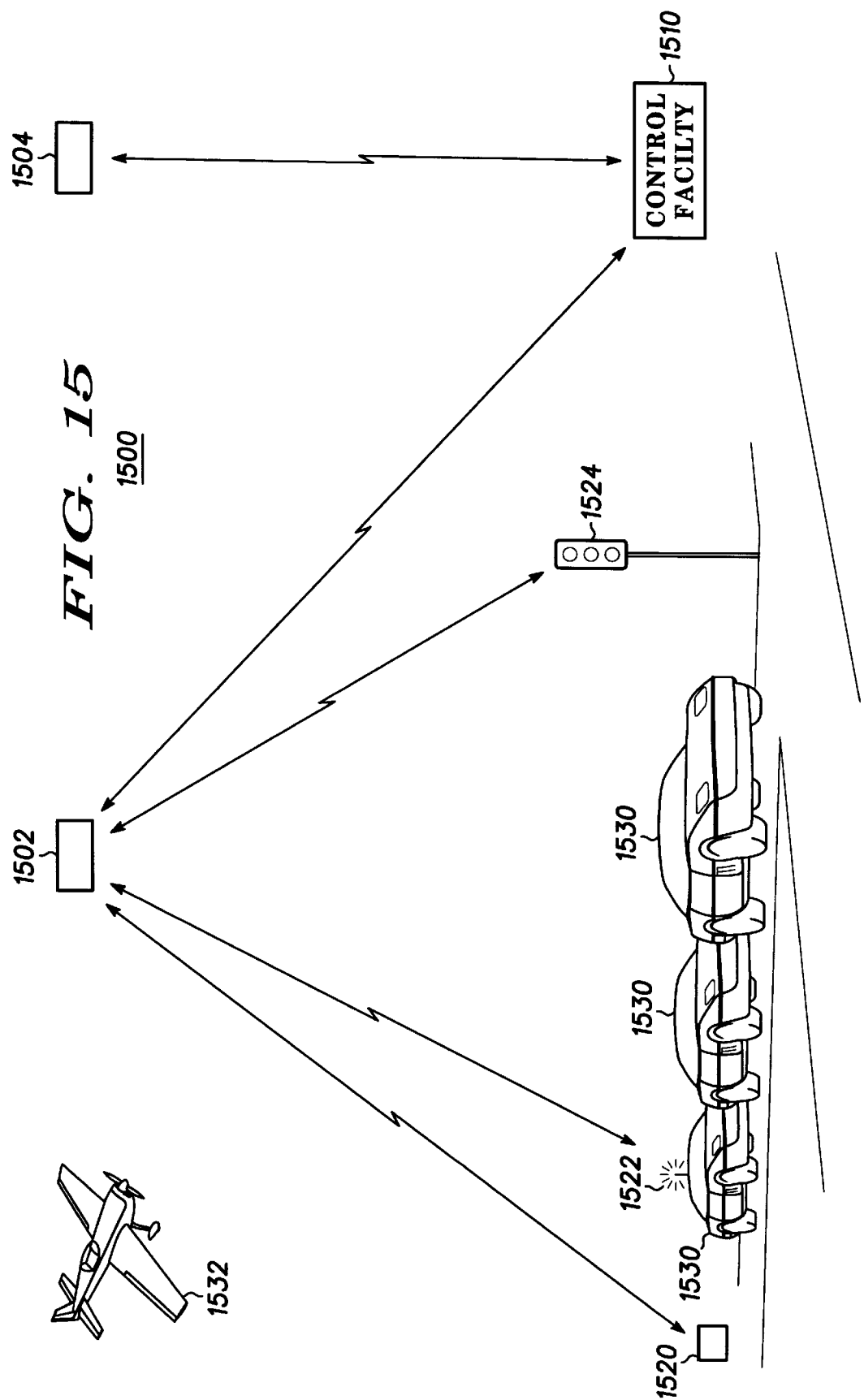
FIG. 15 illustrates a communication system which uses a communication platform as a sensing device in accordance with an alternate embodiment of the present invention.

FIG. 15 illustrates a communication system 1500 which uses a communication platform as a sensing device in accordance with an alternate embodiment of the present invention. The communication platform used as a sensing device could also provide communication services such as those described in conjunction with FIGS. 1–14 in an alternate embodiment of the present invention. Communication system 1500 comprises control facility 1510 and at least one communication platform used as a remote sensing device 1502, 1504.

In a preferred embodiment, as will be explained in more detail in conjunction with FIG. 17, remote sensing device 1502 receives instructions from control facility 1510 and senses physical phenomenon which occur in accordance with those instructions.

Remote sensing device 1502 can be used to sense any of a wide range of physical phenomenon. After sensing the physical phenomenon, remote sensing device 1502 generates data describing the physical phenomenon and sends the data to control facility 1510 over a link between remote sensing device 1502 and control facility 1510. The link could be, for example, an RF or optical link. In an alternate embodiment, if an RF or optical link are not desired (e.g., because the data is highly sensitive), remote sensing device 1510 could store the data onto a physical recording device and physically release the physical recording device from a compartment Release of the recording device could be periodic, for example, or could result from an instruction from control facility 1510.

In a preferred embodiment, control facility 1510 takes action based on the data. For example, remote sensing device 1502 could sense data related to vehicular traffic 1530 on the ground, send the data to control facility 1510, and control facility 1510 can control operations of traffic signals 1524 based on the traffic. In an alternate embodiment, remote sensing device 1502 can send a signal directly to the traffic signal. In another alternate embodiment, remote sensing device 1502 could send the data describing the physical phenomenon to individual communication devices 1520 for use by users of those units.

Remote sensing device 1502 could also be used as a return path for control signals from control facility 1510 to equipment located proximate to the surface of the earth (e.g., traffic lights 1524). These control signals could be generated by control facility 1510 in response to sensory data received by control facility 1510 from remote sensing device 1502 and the control signals could cause the equipment to perform a particular function.

In an alternate embodiment, remote sensing device 1502 could be used to sense and generate data related to airplane traffic 1532. Control facility 1510 could receive and distribute the data as needed in order for the airplane traffic to be controlled. Alternatively, remote sensing device 1502 could distribute the data.

In another alternate embodiment, remote sensing device 1502 could sense and generate data related to natural disasters and/or emergencies such as, for example, fires. Control facility 1510 and/or remote sensing device 1502 could distribute the data as needed in order for the fires to be controlled.

In another alternate embodiment, remote sensing device 1502 could sense and generate data related to ozone and pollution levels. Control facility 1510 and/or remote sensing device 1502 could distribute the data as needed in order to give notice of pollution levels.

In another alternate embodiment, remote sensing device 1502 could sense information related to a location of an individual transmitting unit 1522 (e.g., on a car or a person) and generate data describing the location. Remote sensing device 1502 could then send the data to control facility 1510 so that control facility 1510 can distribute the data and appropriate action could be taken. This would be especially useful for applications such as retrieval of stolen vehicles, personal location, or home alarm monitoring.

In another alternate embodiment, remote sensing device 1502 could sense and generate data related to infrared images. Control facility 1510 and/or remote sensing device 1502 could distribute the data as needed. This would be effective, for example, for monitoring factory emissions and heat radiation, or monitoring of environmental heat pollution, in general.

In another alternate embodiment, remote sensing device 1502 could sense and generate data related to astronomical phenomenon. Remote sensing device 1502 would be especially useful for this application because its high-altitude location would enable it to sense the phenomenon with less light pollution than exists near the surface of the earth. Similarly, remote sensing device 1502 could sense and generate data related to the earth atmosphere. A sensing device located within the stratosphere would yield more accurate data which could be used for atmospheric profiling. This data would be sent to control facility 1510 for analysis.

In still another alternate embodiment, remote sensing device 1502 could sense and generate data related to the earth terrain. Control facility 1510 and/or remote sensing device 1502 could use the data to generate a map of the earth terrain. In a preferred embodiment, control facility 1510 could receive multiple sets of data from multiple remote sensing devices 1502, 1504, enabling control facility 1510 to generate a multi-dimensional map of the earth terrain. In an alternate embodiment, a single remote sensing device 1502 could sense terrain data from different positions so that a multidimensional map could be generated.

In another alternate embodiment, remote sensing device 1502 could sense and generate data related to backscatter radiation and send the data to control facility 1510. Remote sensing device 1502 could sense and generate data related to marine phenomenon and send the data to control facility 1510. Numerous sensing applications could be imagined for remote sensing device 1502 and those listed above are not meant to limit the scope of the present application.

Figure 16:
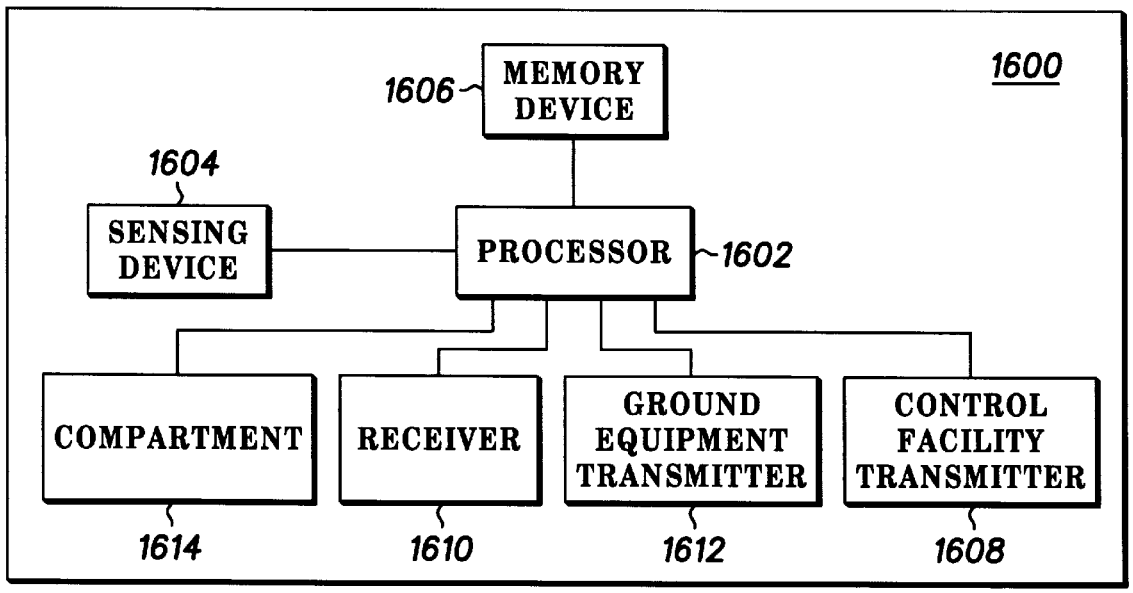
FIG. 16 illustrates a block diagram of a communication platform in accordance with an alternate embodiment of the present invention.

FIG. 16 illustrates a block diagram of a communication platform used as a remote sensing device 1600 in accordance with an alternate embodiment of the present invention. Remote sensing device 1600 could be used to perform any of the applications described in conjunction with FIG. 15. Remote sensing device 1600 includes processor 1602, sensing device 1604, memory device 1606, control facility transmitter 1608, and control facility receiver 1610. For particular applications described above in conjunction with FIG. 15, remote sensing device 1600 also could include ground equipment transmitter 1612 and/or compartment 1614. In alternate embodiments where remote sensing device 1600 also performs communication services such as those described in conjunction with FIGS. 1–14, remote sensing device 1600 also could include components of those communication platforms described in conjunction with FIG. 2.

Remote sensing device 1600 receives information from a control facility (e.g., control facility 1510, FIG. 15) via receiver 1610. Based on the information, sensing device 1604 senses physical phenomenon and generates data describing the phenomenon. In an alternate embodiment, sensing device 1604 could continuously sense the physical phenomenon without receiving information from the control facility. The data can be stored in memory device 1606, if necessary. Processor 1602 then processes the data, if necessary. In a preferred embodiment, the data is sent to the control facility via control facility transmitter 1608.

In an alternate embodiment, the data can be stored on a physical recording device which is released from compartment 1614 of remote sensing device 1600. In another embodiment, remote sensing device 1600 can send the data and/or instructions to ground equipment via ground equipment transmitter 1612. The instructions could originate from the remote sensing device 1600 or the remote sensing device 1600 could act as a relay of instructions from the control facility to the ground equipment.

Figure 17:
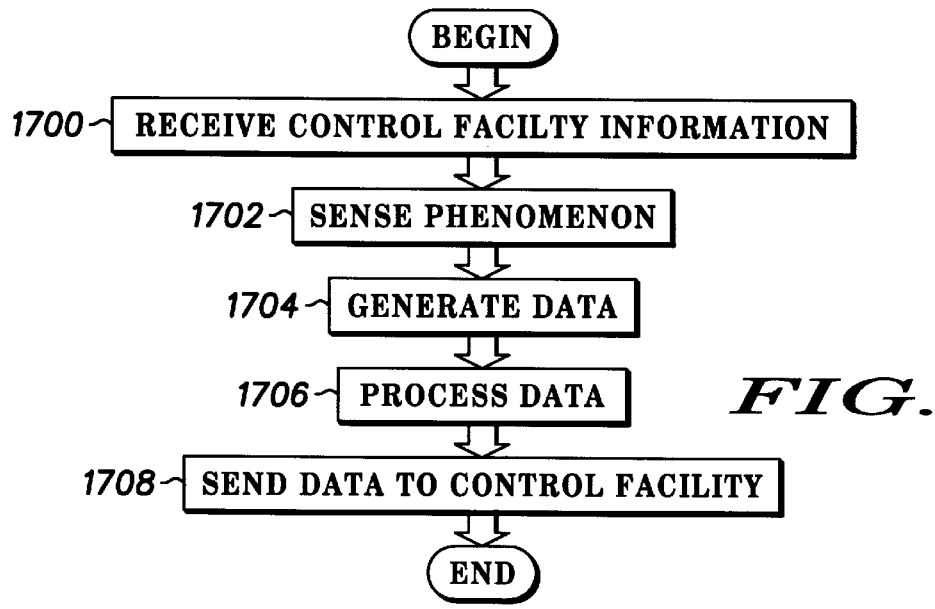
FIG. 17 illustrates a flowchart of a method for using a communication platform to sense and respond to phenomenon in accordance with an alternate embodiment of the present invention.

FIG. 17 illustrates a flowchart of a method for using a communication platform as a remote sensing device to sense and respond to phenomenon in accordance with an alternate embodiment of the present invention. The method could be used for the applications described in conjunction with FIG. 15 by a remote sensing device described in conjunction with FIG. 16.

The method begins, in step 1700, when information is received by a remote sensing device from a control facility. The information could define the parameters of what physical phenomenon the control facility wants the remote sensing device to observe, for example. Based on the information, the remote sensing device senses physical phenomenon in step 1702. In step 1704, the remote sensing device generates data describing the phenomenon and, in step 1706, processes the data.

In a preferred embodiment, the data is then sent to the control facility in step 1708 and the procedure ends. In an alternate embodiment, the remote sensing device could receive instructions from the control facility which the control facility generated based on the data. The remote sensing device could then send those instructions to equipment (e.g., traffic lights) in order to control operations of the equipment.

The present invention has been described above with reference to preferred embodiments. However, those skilled in the art will recognize that changes and modifications may be made in these preferred embodiments without departing from the scope of the present invention. For example, the processes and stages identified herein may be categorized and organized differently than described herein while achieving equivalent results. These and other changes and modifications which are obvious to those skilled in the art are intended to be included within the scope of the present invention.

What is claimed is:

1. A communication device comprising:
   a signal reception means for receiving a combined signal from a communication platform which combined multiple first signals from multiple wireless communication devices prior to sending the combined signal to the communication device, wherein the signal reception means receives the combined signal from the communication platform and the communication platform is a high-elevation, non-orbiting communication platform which includes buoyancy means for positioning the communication platform without the use of a support structure to the ground; and
   a processor means, coupled to the signal reception means, for separating the combined signal, resulting in the multiple first signals.

2. The communication device as claimed in claim 1, wherein the signal reception means is a directional antenna oriented to receive the combined signal from the communication platform.

3. A communication device comprising:
   a receiver suitable to receive a combined signal from a communication platform which combined multiple first signals from multiple wireless communication devices prior to sending the combined signal to the communication device, wherein the receiver receives the combined signal from the communication platform and the communication platform is a high-elevation, non-orbiting communication platform which includes buoyancy means for positioning the communication platform without the use of a support structure to the ground; and
   a processor, coupled to the receiver, suitable to parse the combined signal, resulting in the multiple first signals.

4. The communication device as claimed in claim 3, wherein the receiver is a directional antenna oriented to receive the combined signal from the communication platform.

5. The communication device as claimed in claim 3, further comprising:
   a transmitter, coupled to the processor, suitable to send second signals to the communication platform.

6. A communication device comprising:
   a processor means for combining signals from multiple sources, resulting in a combined signal; and
   a signal transmission means for sending the combined signal to a communication platform which separates the combined signal into multiple signals and routes the multiple signals to various receiving devices;
   wherein the signal transmission means sends the combined signal to the communication platform and the communication platform is a high-elevation, non-orbiting communication platform which includes buoyancy means for positioning the communication platform without the use of a support structure to the ground.

7. A communication device suitable for providing spectral reuse, the communication device comprising:

a first directional antenna suitable to receive first signals from a non-orbiting communication platform and suitable to be positioned in a first antenna position, wherein the non-orbiting communication platform is suitable for positioning above the earth;

a second directional antenna suitable to receive second signals from another wireless device and to be positioned in a second antenna position, wherein when the first signals and the second signals use an overlapping portion of spectrum, the first directional antenna and the second directional antenna can receive the first signals and the second signals without interference from each other because of spatial diversity between the first antenna position and the second antenna position; and a processor, coupled to the first directional antenna and the second directional antenna, suitable to control operations of the communication device.

8. The communication device as claimed in claim 7, further comprising:

a tracking device, coupled to the second directional antenna, suitable to move the second directional antenna in a manner such that the second directional antenna can track the another wireless device and maintain a communication link as the another wireless device moves with respect to a surface of the earth.

9. The communication device as claimed in claim 7, wherein the processor is further suitable to determine when the first antenna position and the second antenna position will result in signal degradation, and to control the operations so that the signal degradation does not occur.

* * * * *